United States Patent [19]

Buchelt

[11] Patent Number: 4,531,888
[45] Date of Patent: Jul. 30, 1985

[54] WATER TURBINE

[76] Inventor: Benno Buchelt, Zellerstrasse 16, A-9063 Maria Saal, Austria

[21] Appl. No.: 341,561

[22] Filed: Jan. 21, 1982

Related U.S. Application Data

[63] Continuation-in-part of Ser. No. 110,248, Jan. 7, 1980, abandoned.

[30] Foreign Application Priority Data

Jan. 18, 1979 [AT] Austria .................................. 384/79

[51] Int. Cl.³ .......................... F01D 1/04; F01D 17/12
[52] U.S. Cl. ................................. 415/148; 415/199.5; 415/213 C; 415/DIG. 5
[58] Field of Search ............... 415/148, 162, 189, 193, 415/199.4, 157, 199.5, 213 C, 190, DIG. 3, DIG. 5

[56] References Cited

U.S. PATENT DOCUMENTS

| 735,107 | 8/1903 | Junggren | 415/199.5 |
|---|---|---|---|
| 875,374 | 12/1907 | Patitz | 415/199.5 X |
| 1,786,166 | 12/1930 | Moody | 415/148 X |
| 2,260,169 | 10/1941 | Couch | 415/148 UX |
| 2,500,070 | 3/1950 | Hagen | 415/162 |
| 2,706,451 | 4/1955 | Mayer-Ortiz et al. | 415/193 X |
| 2,811,303 | 10/1957 | Ault et al. | 415/DIG. 5 X |
| 3,267,869 | 8/1966 | Vartapetov | 415/190 |
| 3,514,216 | 5/1970 | McAninch | 415/199.5 X |
| 3,738,105 | 6/1973 | Buchelt | 60/39.31 |
| 3,750,789 | 8/1973 | Buchelt | 192/105 A |

FOREIGN PATENT DOCUMENTS

| 127255 | 3/1932 | Austria | 415/199.5 |
|---|---|---|---|
| 1074978 | 2/1966 | Fed. Rep. of Germany | 415/199.5 |
| 1154776 | 4/1958 | France | 415/193 |

Primary Examiner—Robert E. Garrett
Assistant Examiner—Joseph M. Pitko
Attorney, Agent, or Firm—Toren, McGeady, Stanger, Goldberg & Kiel

[57] ABSTRACT

In a water turbine two or more turbine stages are arranged one immediately behind the other in the axial direction. Each stage is constructed alike and includes a tubular housing portion with guide vanes laterally enclosing a tubular runner portion with runner vanes. In a particular water turbine, however, a different final stage may be used to avoid cavitation problems. In one arrangement, the guide vanes in each stage are pivotally mounted and can be controllably positioned from a single control location. The individual tubular housing portions and tubular runner portions are connected together at flanges located at the ends of each stage or section. The flanges are positioned within the tubular runner portions and on the exterior of the tubular housing portions. In some cases the tubular runner portions are held together axially by means of a central tie rod of tubular design.

10 Claims, 32 Drawing Figures

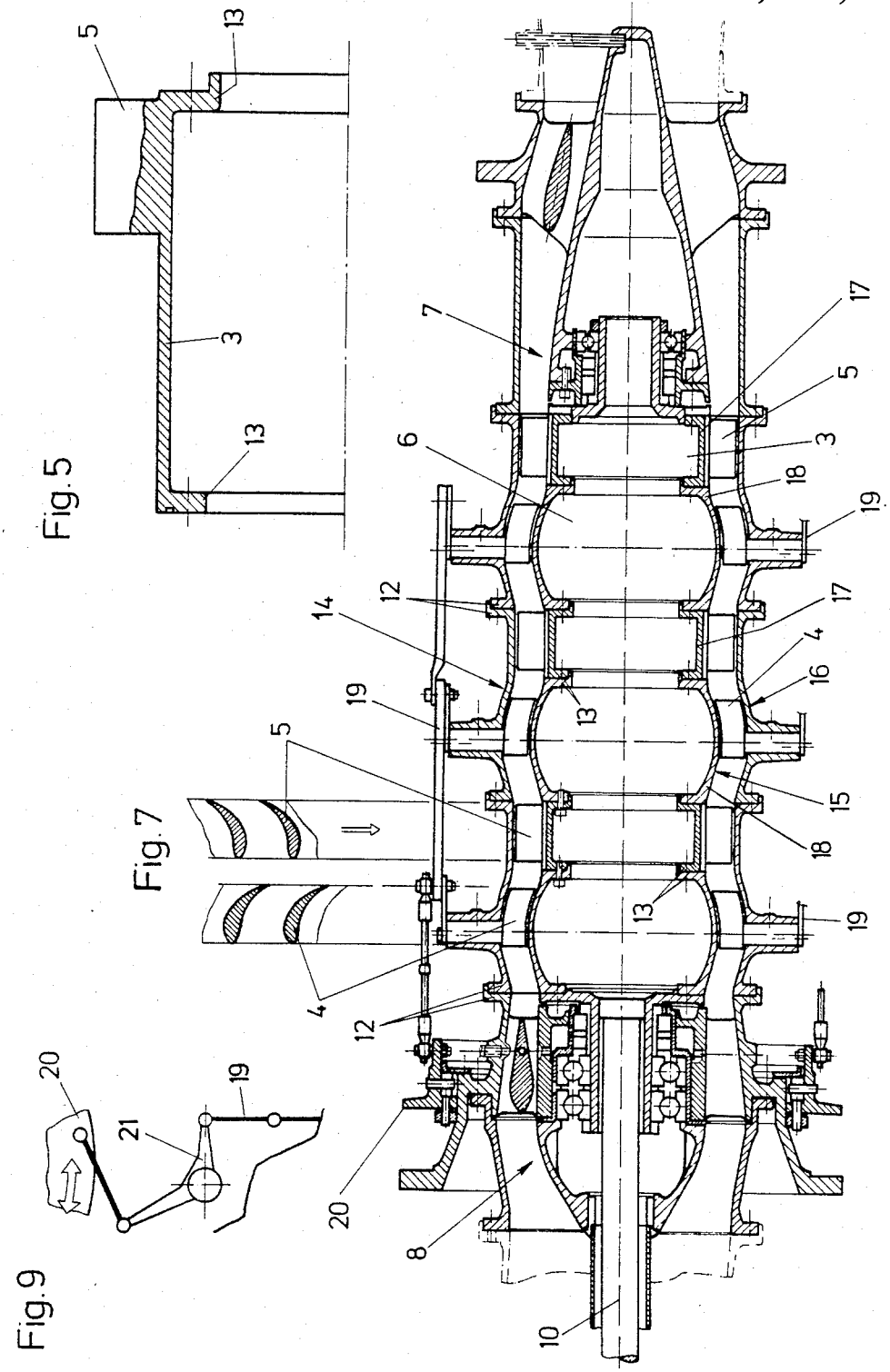

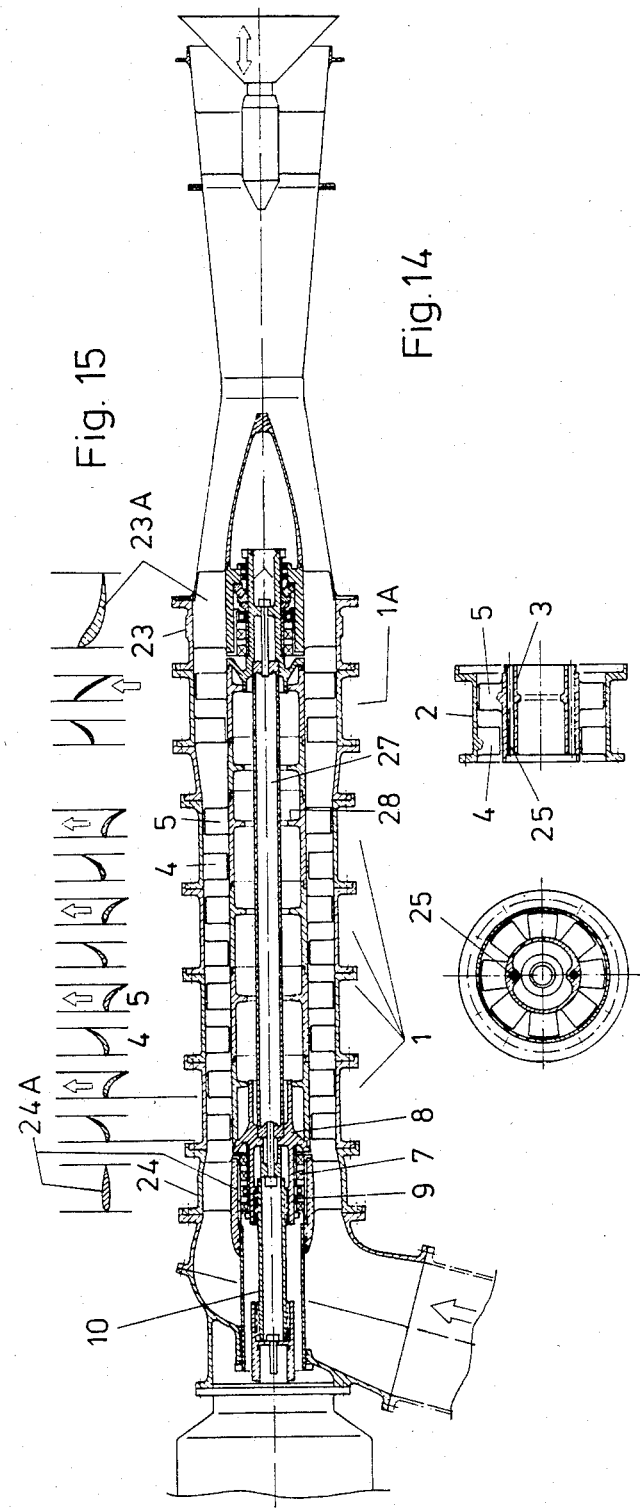

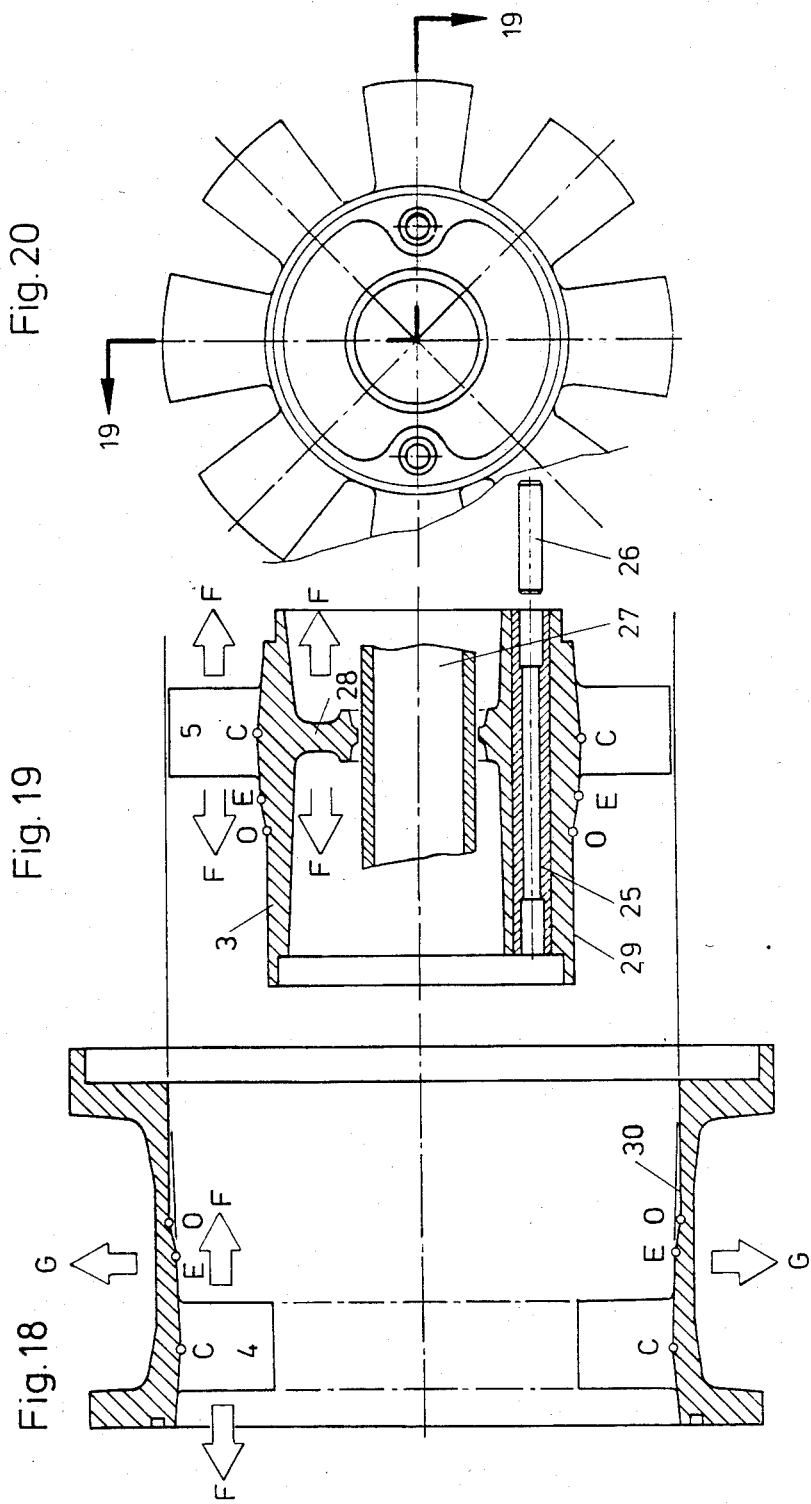

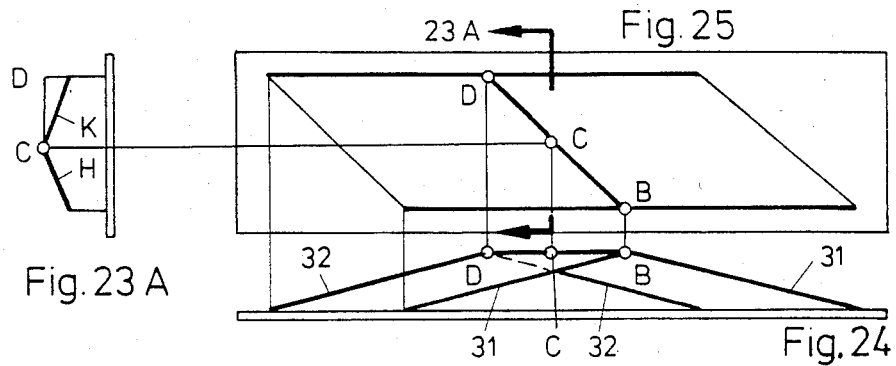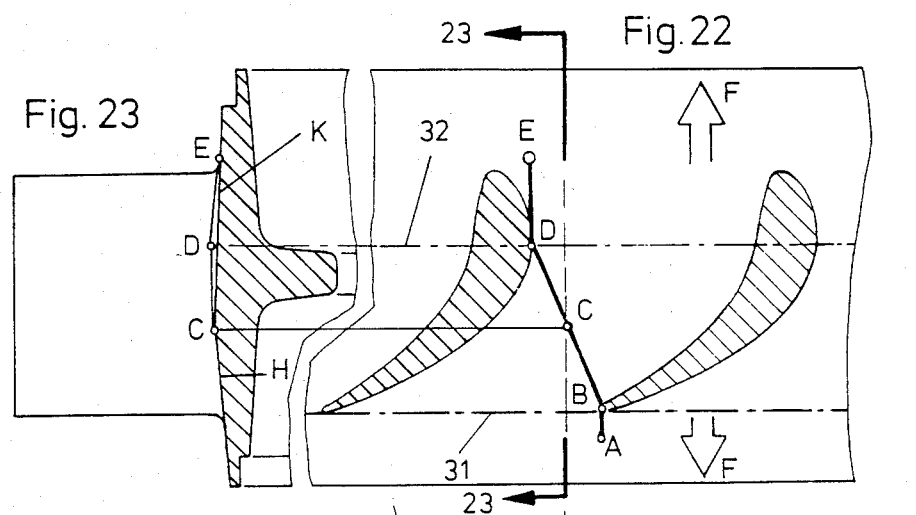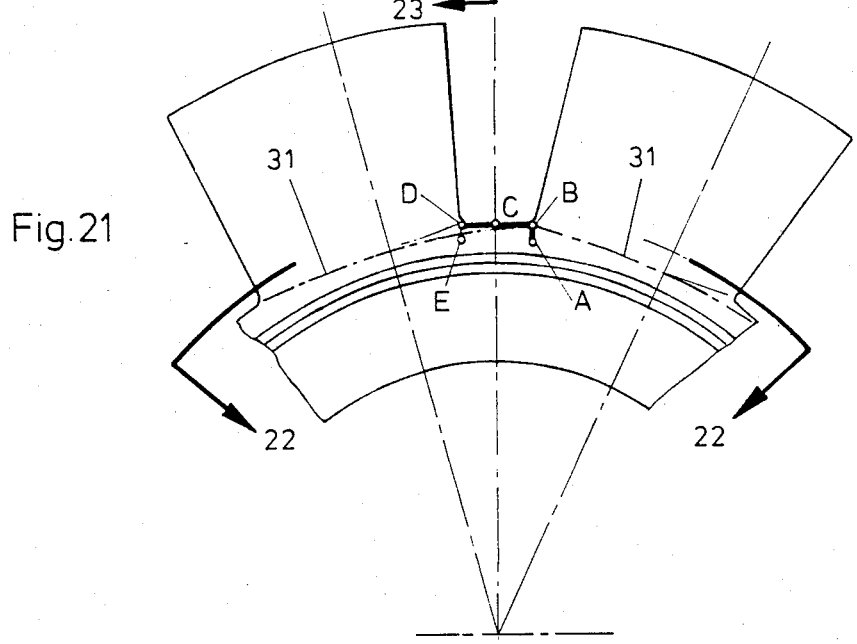

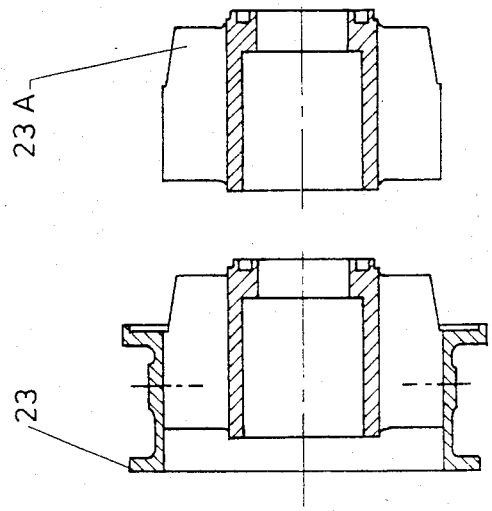
Fig. 29
Fig. 28
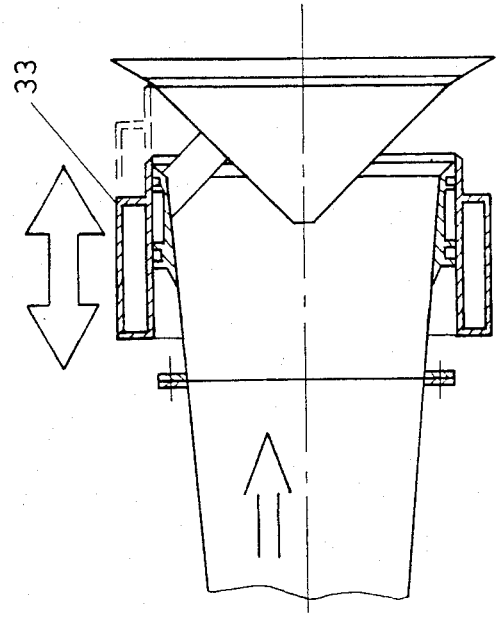
Fig. 27

WATER TURBINE

REFERENCE TO RELATED APPLICATIONS

This application is a continuation-in-part of Ser. No. 110,248 filed Jan. 7, 1980 now abandoned.

SUMMARY OF THE INVENTION

The present invention is directed to a water turbine in which two or more turbine stages are arranged one immediately behind the other in the axial direction. Each turbine stage or section consists of a tubular housing portion with guide vanes or blades and a tubular runner portion with runner vanes or blades.

A variety of hydraulic engines are known in which a plurality of turbine sets are arranged consecutively. In one such embodiment, vane wheels or impellers are positioned in a cylindrical housing and are arranged in spaced relation on a shaft thus hanging axially in flowing water without a high pressure supply pipe. A hydraulic turbine of this type can only utilize the kinetic energy of a flowing body of water, however, it cannot utilize any excess pressure supplied through a pressure pipe by gravity. In such an arrangement, due to the low kinetic energy of the flowing water, there is no need for multiple stages. As a result, no guide wheels or guide vanes are provided, therefore, following each blade wheel an increasing angular momentum directed against the direction of rotation is generated. Accordingly, the vane wheels must all have different angles. Finally, the flow through the hydraulic turbine exits with an angular momentum. In addition to the friction losses occurring in any fluid flow engine, the angular momentum downstream of the turbine uses up a portion of the kinetic energy introduced upstream, accordingly, the efficiency of such an arrangement is very poor.

In another known turbine arrangement the turbine sections are positioned one above the other on one or more common shafts. These turbine sections located on the same shaft are coupled. For an optional distribution of the water power supplied, in such an arrangement the turbine sections are, on one hand, connected consecutively over lockable lines and, on the other hand, are connected directly to the water basin over lines which are also lockable. In such an arrangement, various turbine sections are connected in parallel or in series, however, there are always individual sections which must be connected to intermediate reservoirs over a complicated line system for controlling the output.

Still another multiple stage pump turbine is provided with stages which operate on a joint shaft and are arranged consecutively in the flow direction. These individual stages are consecutively connected by means of valves and shaft couplings.

In yet another known turbine arrangement, one or more turbines are arranged in a tube which is curved at least twice. In such an arrangement, the curved sections of the tube are essential, and the curved sections make it possible for individual shafts to extend in a rectilinear manner toward the individual turbines which are mechanically independent of one another.

Moreover, in a known water turbine a plurality of turbine stages are arranged one immediately after the other, for example, forty of these stages can be arranged one following the other. Such a turbine arrangement requires a support tube which forms the runner and another tube forming the external housing. Housing parts with guide vanes and runner parts with runner vanes are fastened to these two tubes which must be manufactured individually based on the length of the water turbine, that is, in accordance with the number of turbine stages. Accordingly, an optional change in the number of stages is not possible. Therefore, in this known embodiment, the arrangement of special parts for a certain number of stages is required with these special parts involving one or several one-piece runner portions and one or several one-piece housing portions.

Therefore, the primary object of the present invention is to provide a simple arrangement of a water turbine suitable for mass production and one in which a simple adjustment can be effected in accordance with varying amounts of water and different heads.

In accordance with the present invention, the housing parts with the guide vanes and the runner parts with the runner vanes form the turbine housing and the turbine runner, respectively. At their ends each of the housing parts and runner parts are provided with flanges, recesses, projections or the like for centering and/or fastening the consecutively arranged parts. In one embodiment, the runner parts are held together by means of a central tie rod. Further, the combined housing parts and runner parts forming individual turbine stages are arranged to be mutually exchangeable. In another embodiment, however, a special stage is provided at the fluid exit.

In the water turbine of the present arrangement, there are no special parts which are required for only a limited number of these stages except the one embodiment with the central tie rod, since, in accordance with the present invention, the housing parts with the guide vanes and the runner parts with the runner vanes directly form the turbine housing and the turbine runners. By a consecutive arrangement of two or more turbine stages, the desired length of the turbine can be constructed by an appropriate number of the stages. Accordingly, the turbine can be produced and assembled in a very simple manner and, depending on its application, turbine stages can be added or removed. If the overall turbine is increased or decreased in the number of stages, there is no specific construction of the housing or of the other parts required. Therefore, in accordance with the present invention, adjustment to an existing head can be made by varying the number of turbine stages which are provided by standardized stages maintained in storage by utilizing a modular design with the same rate of rotation and the same amount of liquid. Such a design is of significant importance for mass production, since a plurality of the same parts can be produced in large numbers keeping the production costs of such a water turbine very low.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 5 is an axially extending section through half of a runner portion with the runner vane formed integrally with it;

FIG. 7 is an axially extending sectional view of another embodiment of the water turbine in accordance with the present invention;

FIGS. 8 and 9 are schematic views illustrating the control of the turbine shown in FIG. 7;

FIG. 14 is an axially extending sectional view of still another embodiment of the water turbine in accordance with the present invention;

FIG. 15 is a cross sectional view of the stator and runner blades of the embodiment shown in FIG. 14;

FIG. 16 is an end view of a typical stage of the turbine shown in FIG. 14;

FIG. 17 is an axially extending sectional view of the typical stage shown in FIG. 16;

FIG. 18 is an axially extending sectional view of a stage casing (stator) with integrally cast blades;

FIG. 19 is an axially extending sectional view taken along the lines 19—19 in FIG. 20 and illustrating a die cast runner;

FIG. 20 is an end view of the runner shown in FIG. 19;

FIG. 21 is an elevational view of a part of a runner embodying the present invention;

FIG. 22 is a cross sectional view taken along the lines 22—22 in FIG. 21;

FIG. 23 is a cross sectional view taken along the lines 23—23 in FIG. 22;

FIGS. 23a, 24 and 25 are schematic representations of FIGS. 21, 22 and 23, respectively;

FIG. 27 is a partial side view, partly in section, of a tubular cone defuser such as in FIG. 14 but on an increased scale;

FIG. 28 is a sectional view illustrating the application die casting methods to the bearing support casting; and FIG. 29 is a sectional view of the bearing hub with integrally cast support struts.

DETAIL DESCRIPTION OF THE INVENTION

Figure 1:
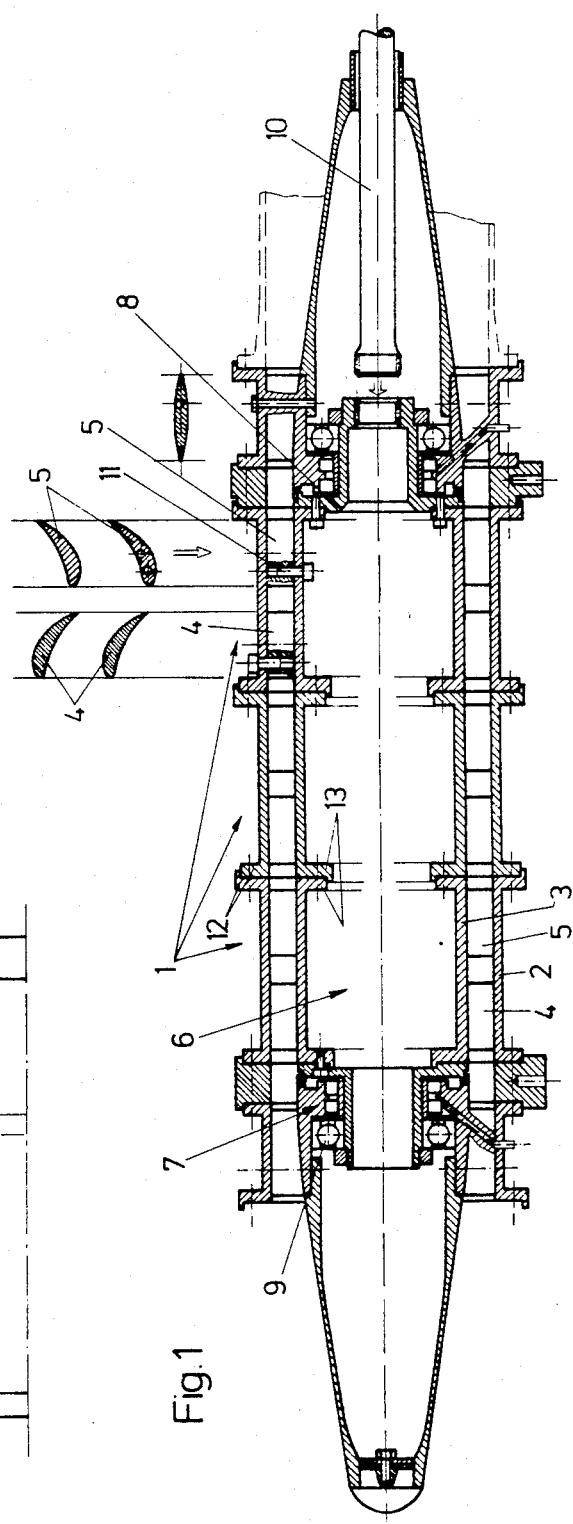
FIG. 1 is an axially extending section illustrating a three-stage water turbine embodying the present invention.

In one embodiment illustrated in FIG. 1, a water turbine is constructed as a three-stage axial turbine with each of the three stages forming a turbine unit. As can be seen in FIG. 1, each stage is constructed exactly alike and, therefore, the stages are interchangeable. As a result, similar sections 1 immediately follow one another in the axial direction. Each turbine section or stage 1 consists of a radially outer tubular housing portion 2 and a radially inner tubular runner portion 3. Guide blades or vanes 4 are arranged on and extend inwardly from the housing portion 2 while runner blades or vanes 5 are secured to and extend outwardly from the inner runner portion 3. Turbine runner 6 is formed by the three runner portions 3 and is connected at its opposite ends to bearing parts 7, 8. These bearing parts 7, 8 are spaced apart based on the overall axial length of the number of turbine stages or sections 1. The rearward bearing block as viewed in the direction of flow has a radial guide bearing 9 to which little load is applied and remains the same for all stages. The forward bearing part 8 is also the same for any number of stages which is acceptable with respect to axial forces, however, when the number of stages is further increased, it requires a larger bearing. In small turbines, the upstream and downstream bearing parts are mirror images of one another and can be interchanged with a slight assembly change. The runner 6 is connected to a generator, not shown, through a stub shaft 10.

Figure 3:
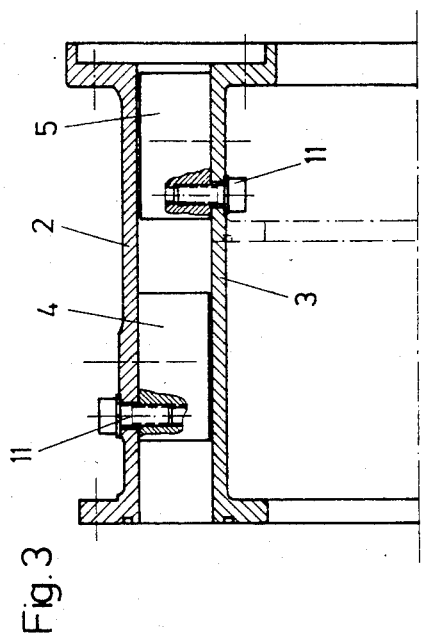
FIG. 3 is an axially extending sectional view through half of a runner portion of the turbine.

Runner parts 3 and, as a result, the runner 6 are constructed as tubular or hollow bodies which are very significant for reasons of weight. Furthermore, the runner constructed as a tubular or hollow body is also advantageous for assembly reasons, since the flanges for interconnecting adjacent runner portions are located within the tubular section and, in this embodiment, the radially outwardly extending vanes can be secured to the runner portion from its hollow interior. The use of a solid runner would only be considered if the water turbine is small in which case the individual runner portions or parts could be held together by a centrally positioned threaded tension rod. Moreover, an axially extending tension rod can also be used in hollow runners if the dimension of the runner portions are so small as to preclude the use of interior flanges and also for large runners, see FIG. 14 and FIG. 19 when die casting is used. Both the runner vanes 5 and the guide vanes 4 can be connected to their respective runner and housing portions by means of screws 11, note FIG. 3.

Housing portions 2 have radially outwardly directed flanges 12 while the runner portions 3 have radially inwardly directed flanges 13, accordingly, the individual turbine sections 1 can be easily assembled together. A mutual fastening of the sections can be effected by means of screws at these flanges which advantageously are provided with centering rings.

In accordance with the present invention, as compared to conventional axially extending water turbines, the high hub ratio is of significant importance when cylindrical blades are applied. This hub ratio is the ratio of the hub radius to the internal radius of the housing, that is, the ratio of the radii of the annular cross-section through which flow takes place perpendicularly of the axis of the engine. Generally, better efficiency is expected from a small hub ratio (about 0.5 to 0.6), because, in such an arrangement, the ratio of the wetted surfaces to the rate of flow is small. On the other hand, in all fluid flow engines of the axial type for gases and liquids, a certain minimal size of the hub is required for hydrodynamic or aerodynamic reasons because the ducts between the radially inwardly converging vanes must have the sharpest curvature at the roots of the vane. Accordingly, this unfavorable range is excluded by a hub having the appropriate size, wherein, due to the first-mentioned reason, a numerical value of about 0.5 to 0.6 is obtained as an empirically established compromise. In one embodiment of the present construction, the hub ratio is at least 0.7 for the following reasons.

Only in connection with a high hub ratio and a percentage of reaction of 0.5 at the middle of the radial extension of the blade and with an interpretation of "percentage of reaction=constant over the radius", almost cylindrical guide and runner wheel vanes results. Accordingly, when the hub ratio is larger than 0.7, in this type of interpretation, the vanes can be made exactly cylindrical as a very good approximation, that is, without the otherwise conventional twisting in space about a radial axis of gravity of the blade section with changing radii. In addition to a simple blade production, this interpretation also results in good possible efficiency of the stages. The blades may also be twisted, particularly at smaller hub ratios when using die casting because cylindrical blades have no manufacturing benefit for die castings.

The practically cylindrical blade or vane is not only a concession to a simple manufacturing method, it is used for the first time in water turbines in connection with a large hub ratio and a percentage of reaction of 0.5. This application is generally only appropriate in a multiple stage turbine, since axial turbines with one stage and otherwise conventional relatively high heads for each stage (more than 40 meters, for example), and with only a slight curvature of the vane profile together with the desire to obtain a discharge without an angular momentum, are only constructed with a percentage of reaction at the middle of the radius of more than 0.85 (conventional value for Kaplan turbines), that is, a value differing significantly from the value of 0.5.

When turbines are produced in small numbers, the vanes can be constructed of cylindrical rod material. In this case, the vanes can be radially connected to the housing or the runner by a threaded connection, soldering or welding. In this regard, reference is made to FIGS. 3 and 6. When vanes are secured by a threaded connection, it is possible to replace such vanes if they are damaged.

If the vanes are produced in large numbers, however, a casting method is more appropriate in which a multiple split mold is used so that the runner portion and the vanes can be cast as a unit. In such a case, the runner vane can also be twisted in space without resulting in any increase in production costs. Accordingly, it is possible to provide a runner blade twisted in space when it is formed as part of a unit by casting.

The high hub ratio facilitates the use of especially short vanes which are subject to relatively low bending forces at the vane roots resulting from the flow deflection and, therefore, there is the possibility of a radially extending threaded connection with the rotating runner or the stationary housing. The overhung support of the guide vanes from the outside toward the inside is also possible with a large hub ratio.

Due to the low bending stress at the vane root in connection with a large hub diameter and the fact that multiple stages are provided, that is, when one and the same head is distributed over several stages instead of utilizing it in a single stage, the flow deflection forces are also lower in each stage. The total efficiency of several consecutive axial stages is always better than that of a single stage for the same head.

As a result of the special design it is also possible to make the runner vanes or the guide vanes of plastics material or to coat them with a plastics material. Such blades are better able to withstand abrasion than are metal blades in the event a sand-containing water flows through the turbine, because the raised portions at the surface are capable of deformation. When the vanes are formed of a plastics material, they can be cast as individual parts by injection molding or as an entire ring of blades surrounding the metal runner. Such a design would also be relatively inexpensive.

Figure 6A:
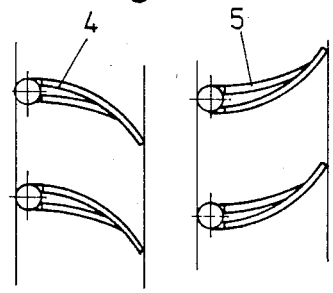
FIG. 6a is a schematic view of the guide and runner vanes of the embodiment shown in FIG. 6.
Figure 2:
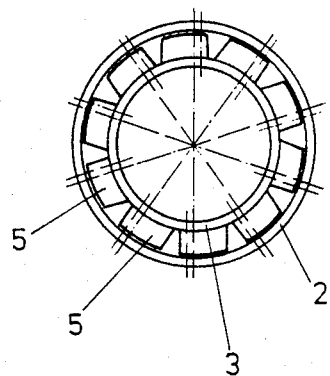
FIG. 2 is a transverse section through the turbine.
Figure 6:
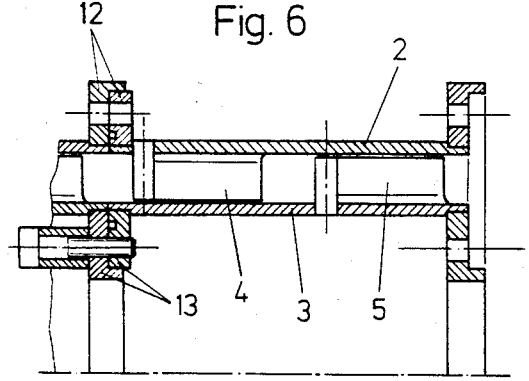
FIG. 6 is an axially extending sectional view through half of a turbine stage illustrating another embodiment of the present invention.

In FIGS. 6 and 6a, a special embodiment of the housing portions 2 and runner portions 3 is shown. This embodiment involves a welded or soldered construction where the tubular parts and flanges are welded or soldered together. The guide vanes and the runner vanes are also connected to the tubular parts by welding or soldering. The guide vanes 4 and the runner vanes 5 are also made of sheet material. Such an embodiment is especially appropriate only when small numbers are being produced.

In the embodiment of the water turbine illustrated in FIG. 7, the guide vanes 4 are pivotally mounted at spherically shaped surfaces for providing a constant guide vane spacing. For reasons of assembly, to avoid splitting the turbine housing 14 in the plane of the radial axes of rotation of the guide vanes, the spherical surface is only provided on the side of the runner wheel as seen from the plane of the axes of rotations of the guide vanes and the guide vanes extend primarily on the side of the runner wheel from the axis of rotation. As a result, the hub portion can be axially inserted into an undivided housing after the assembly of the guide vanes. With regard to this embodiment, it is further noted that each runner portion 3 is formed of two separate sections 17, 18 which are connected in the same manner as the individual runner portions, where the cylindrical section 17 carries the runner vanes 5 and is followed by the section 18 having the arcuate-like surface 15 extending in the axial direction of the turbine.

Figure 8:
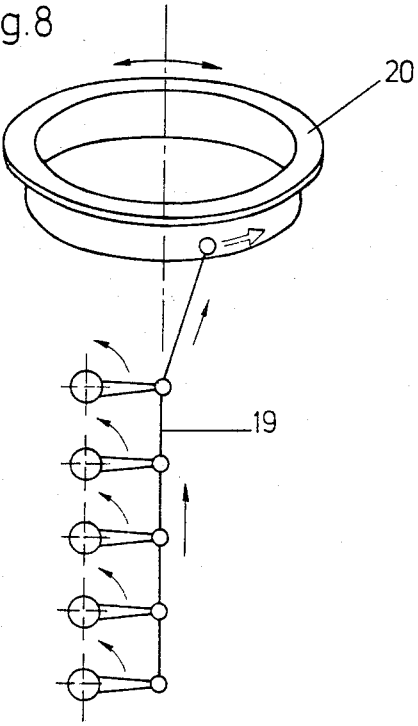

In this arrangement, as can be seen in FIGS. 7 to 9, the guide blades are mounted on the housing so that they can be pivoted about a radially extending axis, that is an axis extending radially outwardly from and transversely of the turbine axis. The guide vanes 4 are adjustable by means of tension rods 19 extending in parallel relation with the axis of the turbine. The adjustment of the guide vanes is effected by rotating a single guide ring 20 located at one end of the turbine. In the arrangement shown in FIG. 9, an additional intermediate lever 21 is provided to obtain an embodiment which permits larger pivoting angles for the guide vanes 4.

Two embodiments of multiple-stage axial water turbines have been illustrated in the drawing. It will be appreciated that within the scope of the invention, there are various constructional changes possible. The shapes of the runner and the housing can be varied within appropriate limits. It is also possible to construct a housing portion by forming a section of two or more portions. Further, there are various possibilities for forming the bearing portions, the inlet and outlet openings of the water turbine and the arrangement of support ribs.

Therefore, in accordance with the present invention, a simple water turbine is provided which is particularly suitable for mass production and which can be adjusted to different amounts of water and varying heads by connecting together individual components during assembly. As a result, adjustment is effected beforehand and subsequent adjustment and shutdown of individual elements of assembled turbine is avoided. The use of a water turbine with adjustable guide vanes is possible, note the embodiment of FIG. 7, however, it is known that an axial water turbine with rigid runner wheel vanes can only be controlled without losses within a few percentage points of the nominal output of adjustable guide vanes. The embodiment proposed in FIG. 7 is only controlled within a few percentage points of its nominal output and this, if possible, in connection with about 10 hydraulic engines of the embodiment according to FIG. 1 for obtaining a so-called island operation which is independent from a large network. In such an island operation, the load on the island network can be controlled in such a way that the water turbines according to FIG. 1, which are either running or shutdown for reasons of efficiency because of their rigid guide and runner blades, are connected or disconnected in stages by means of an electronic control. The resulting sudden jump in output is bridged by the controlling turbine of the type of FIG. 7 with the adjustable guide vanes. The known rule for an island network operation applies, which states that the output of the controlling turbine should be approximately equal to the output of the control turbines. By way of example, if the output of the control turbine is about ten times as high as that of the individual control turbines, the controlling turbine can operate in connection with about 10 dependent turbines. If, due to load reduction of the network, a rigid dependent turbine of the type of FIG. 1 is automatically disconnected, the network output is reduced by 1/20, that is by 5%, so that the range of control for the controlling turbine of the type shown in FIG. 7 is indeed within a few percentage points. Accordingly, the disadvantage of rigid runner vanes does not occur, that is, there is no significant loss in efficiency upon a substantial adjustment of the guide vanes.

This described island operation can be established in an area by setting up the individual hydraulic engines at various streams of a side valley which are connected through a line system over several kilometers. Due to the limited loss-free controllability, the embodiment with the adjustable guide vanes is intended primarily as the controlling turbine to be provided in small numbers for the described island operation in which the required control range is very small.

Island operation might also be carried out by keeping the electric power at a constant level thus enabling constant speed, constant frequency and constant voltage with rigid blades inside the turbine. In such a device the variation of needed electric power in different consumer places is supplemented by automatically switching in or switching out water boilers to a nearly constant amount of electric power. The water boilers could provide warm water needed in different consumer places. Even if the supplementary heating is effected by conducting heat energy into the river or creek as waste energy, the overall economical efficiency will be the same as with load adaptation by means of a turbine with fully rotatable vanes and good part load efficiency (Kaplan turbine), because then more water does not flow through the turbine. This has the same overall economical effect as heating up the water with waste energy.

Figure 26:
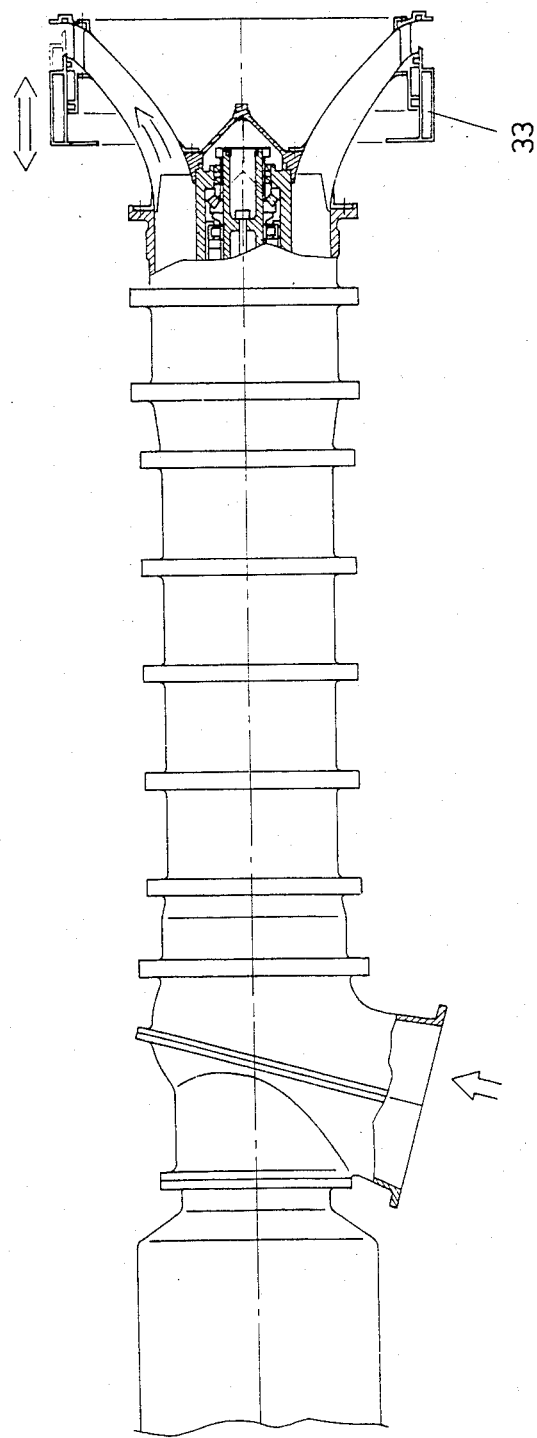
FIG. 26 is a side view, partly in section, of the turbine illustrated in FIG. 14, however, with a very short double-coned defuser and a throttle valve.

The arrangement illustrated in FIGS. 1, 14 and 26 is not only intended for this described island operation along with a controlling turbine of the type illustrated in FIG. 7, but also for so-called drag operation, that is, where an induction generator feeds into an existing large network and its frequency is controlled by the latter, that is, it receives its rotary field from the network. In such an instance, a fine adjustment of the water turbine is not required. In this manner, a system of extremely simple small turbines which are dependent from the network could relieve large power plants. The owner of a water turbine of the type in FIGS. 1, 14 and 26 which is directly connected to the network receives electricity not directly from his turbine, but from the general network, just as any other user. By means of a meter, however, he can charge for the electricity delivered to the network. The benefit to the national economy results from the fact that large power plants can be saved for industrial centers. The setting up of individual water turbines of the type in FIG. 1 which are independent from the network, for the direct use of electricity without control can also be useful for certain purposes, for example, for heating and lighting where it is not required to maintain an exact frequency.

In contrast to the Pelton and Francis turbines, for a compact modular system without excess parts and with the lowest number of different parts in general, only the multiple-stage axial turbine can be used. The multi-stage axial turbine is also most suitable for mass production due to its simple geometry.

A simple water turbine only makes sense when it drives an economical generator. Asynchronous motors are among the least expensive electrical machines which, due to their simple design, can be produced in large numbers and, furthermore, are standardized to a large extent. As is well known, an asynchronous motor becomes a generator when the motor is driven at a speed exceeding the frequency of the excited field. According to the present invention, this characteristic can be utilized in a water turbine without a gear system and, as a result, an inexpensive electrical machine of the type which is already on the market in large numbers is available for effecting energy production in the simplest manner. The speeds of such machines are fixed in dependence upon the number of poles (2,4,6,8) and the standardized frequency (50 Hz) : 3000, 1500, 1000 and 750 rpm. For direct coupling without a gear system, the water turbine must reach one of these speeds. When further considering the output range of these standardized asynchronous motors, which at the present time is about 0.5 to 400 kW, and when making evaluations by means of the term "specific speed" as to which of the basic water turbine types (axial wheel, Francis wheel, Pelton wheel) would be best suited for this range of 0.5 to 200 kW and the speed range of 750 to 1500 rpm, one arrives at the multiple stage axial turbine embodying the present invention. Only the multiple stage axial turbine facilitates, in this specific output range of the standardized asynchronous motors, a speed which is so high that a gear system is not required.

Figure 9A:
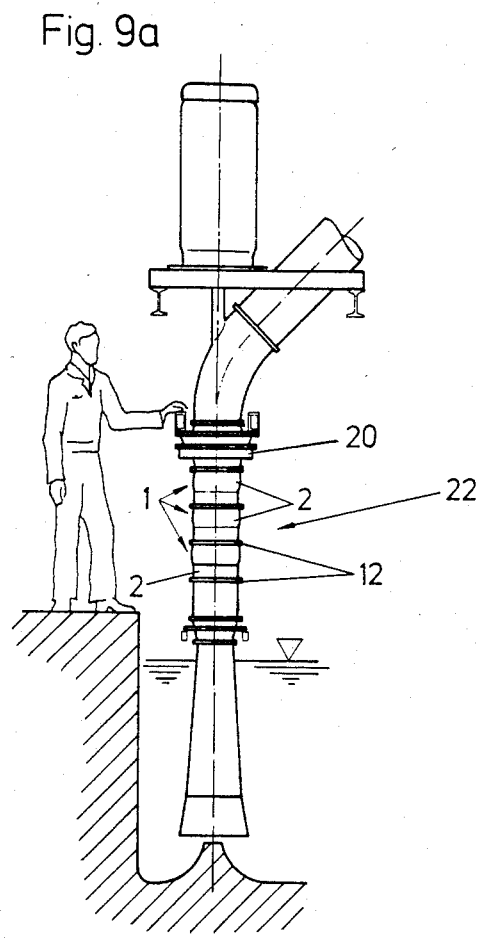
FIG. 9a is an elevational view on a smaller scale of an assembled turbine as illustrated in FIG. 7.

In FIG. 9a, a possible arrangement of a water turbine 22 embodying the present invention is illustrated. This figure affords a size comparison of a 100 kW plant with a person and shows that such a water turbine requires very little space and, therefore, can be located anywhere in the countryside without neglecting the concept of environmental protection. This illustration indicates that by means of the multiple turbine stages the head for each stage, and, as a result, the danger of cavitation, is significantly reduced. Such an arrangement makes possible a positive suction head even in the case of high heads, for example, a suction head of 2.9 m in the water turbine type of FIG. 7 with an effective head of 60 m at the turbine inlet in the case of a 5-stage embodiment. In the case of such a high head, a one-stage Kaplan turbine would have to be located about 20 m below the water level in order to avoid cavitation. Such an arrangement would require an expensive concrete structure.

Figure 10:
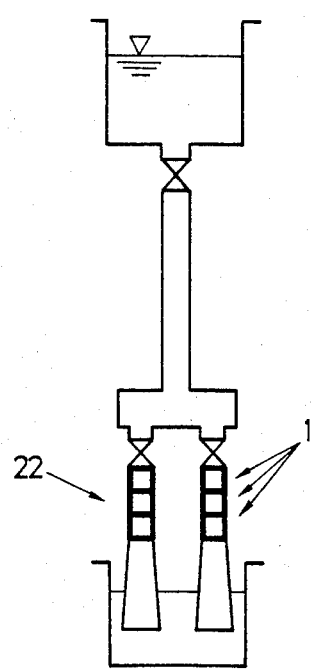
FIGS. 10 to 13 are schematic representations of various possibilities for mounting and combining the stages of a water turbine in accordance with the present invention.
Figure 11:
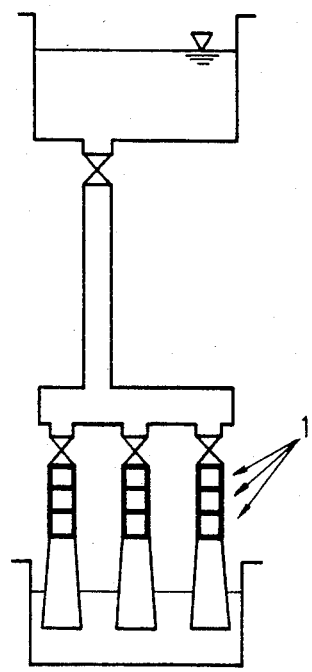
Figure 12:
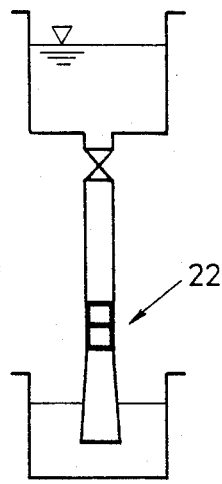
Figure 13:
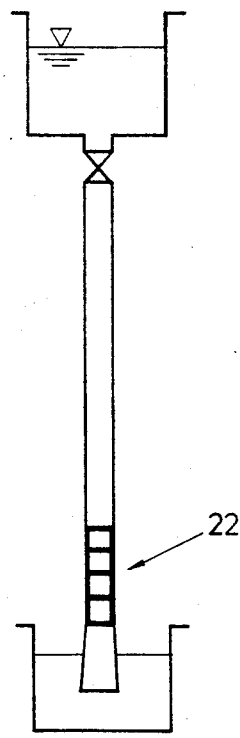

FIGS. 10 and 11 illustrate the possibility of adjusting a water turbine plant embodying the present invention to a respective water flow. In the embodiment shown in these two figures, two or more water turbines are connected in parallel and each turbine can be switched on or off as required. The adjustment to a certain head is made by choosing the specific number of stages in the individual water turbines, as illustrated in FIGS. 12 and 13. The embodiment in these two latter figures indicates the adjustment made in accordance with the amount of water and the head. It would also be possible to vary the amount of water in the head by changing speed, wherein the speed jumps between the standard speeds of 750, 1000, 1500 and 3000 rpm when the lines of an existing network deliver the exciting field, in the case of a self-exciting induction generator which is independent from the network if a standard frequency is considered important.

FIGS. 14 to 29 show design features suited for inexpensive mass production, light weight, easy assemblage and maintenance, and compact dimensions.

Particularly FIG. 26 shows an extremely short design of the multi-stage axial turbine. The short inlet casing and the core engine is exactly the same as shown in FIG. 14, but it has a short double cone diffuser with a cylindrically shaped axially sliding valve in order to adjust and to control the flow by means of throttling.

FIG. 14 shows a single tubular cone diffuser with a moving cone at the end serving as a throttle valve. Instead of the moving cone the same device as shown in FIG. 26 might be applied, a cylindrical slide valve with a rigid cone. Compared to the arrangement with the movable cone this has the advantage of needing only small adjustment forces, whereas the cone is subjected to changing fluid pressure loads, but the central hydraulic or mechanical adjustment device has more chance of being inexpensive than the external ring adjustment device. This variation of exit throttle is shown in FIG. 27.

To locate the throttle at the end of the suction pipe has three advantages compared with the usual arrangement in the high pressure supply pipe: (1) the pressure oscillations behind the throttle organ due to whirling flow does not affect the flow through the turbine, (2) there are no stress problems due to the absence of high pressure, this fact fits into the desired light weight design, and (3) there are no sealing problems due to the absence of high pressure.

All stages are interchangeable in FIG. 14 and FIG. 26 except the last stage 1A, which has a larger external diameter and less curved blade profiles of the stator and runner cascade. Both of these features achieve smaller velocity triangles at the last stage 1A with smaller amounts of velocity components, except the circumferential velocity. This results in less negative fluid pressure within the blade cascades of the last stage which again reduces the danger of cavitation.

Figure 4:
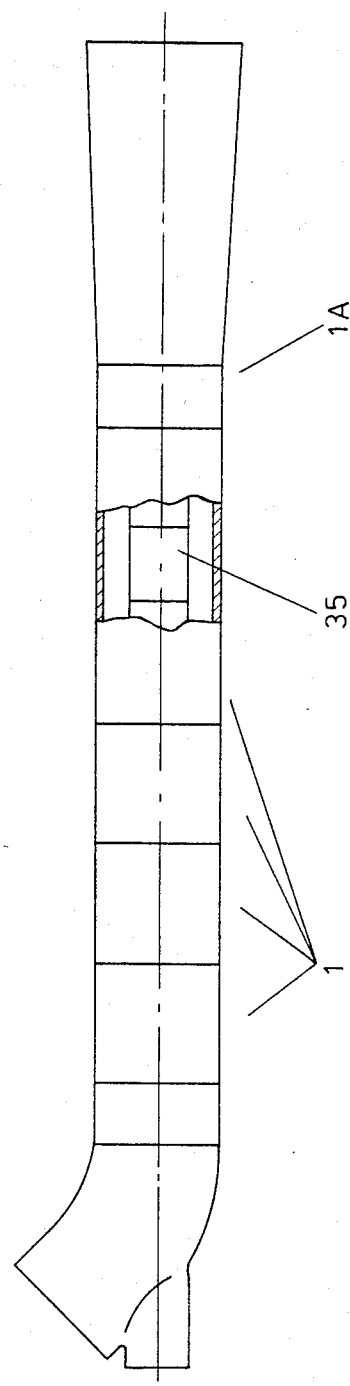
FIG. 4 is a schematic showing of a multi-stage axial turbine with the last stage, coupled over a gear.

Further, in order to reduce the circumferential velocity, a gear 35 as shown in FIG. 4 would be necessary. The gear influences cost and reliability and might be desirable only when the foregoing stages are to be operated at extremely high speeds and no deep water building with a large amount of work and costs is provided in spite of the foregoing high speeds. The last or two last stages then operate at lower speeds thus all having reduced velocity components including the circumferential velocity.

The circumferential velocity might also be reduced in the last stage without a gear by expanding the annular meridian radially inward instead of the slight enlargement, as shown in FIG. 14 and FIG. 26 where the circumferential velocity even slightly increases due to the diameter enlargement. In both cases the meridional velocity components are reduced by the enlargement of the annular flow area either by enlarging the outside diameter as shown in FIG. 14 and FIG. 26 or by reducing the inside diameter not shown. Enlarging the external diameter only has a manufacturing advantage: the runner hub of the particular stage 1A has basically the same dimensions as all foregoing runners and, therefore, the machining process will be simplified.

In FIG. 14 front bearing support frame 23, 23A is manufactured in the same way as described later on regarding rear bearing support frame 23 and 23A represented in detail in FIG. 28 and FIG. 29, and made by the die (pressure) casting method. Spline shaft 10 in FIG. 14 with ample clearance at the flanks of the spline teeth has a dual purpose: it allows ease in disconnecting the turbine by removing the screws in the flange between the inlet casing and front bearing frame, because the turbine can be considered as the last cantilevered mounted piece of the water supply pipe and, on the other hand, this spline shaft transmits torque only and allows self aligned centering of the electric generator due to its cardanic effect.

As in FIG. 19, FIG. 14 also shows a central tension rod 27 with threads at the ends, which has the task only to produce a certain amount of pretension to hold the runners axially together. The torque is transferred through the tubular hubs of the runners by mechanical locking means as splines or pins. This central tension rod permits the runner portions to be die (pressure) cast as to distinguish from the elements 3 and 13 in FIG. 1 with the radially inwardly directed flanges 13 at the axial ends of the runner portions. The die for forming the runner portion of the stages in FIG. 14 might consist of only two axially moving parts having their axial split plane in coincidence with the plane of flange 28.

FIGS. 18 through 25 illustrate a particular geometry which allows die (pressure) casting of the stator and runner blade cascades with a subdivision of the blade generating die part into only two parts. The parts are movable in the axial directions F shown in FIG. 18 and FIG. 19 and allow a friction-free ejection of the finished casting by means of axial movement. For friction-free removal, conical surfaces H and K, shown in FIGS. 23 and 24A, are necessary as known in the state of the art. These two oppositedly inclined conical surfaces H and K intersect between the blades of the cascade thus forming a step on the runner hub surface between adjacent blades or in an analogous manner between the stator blades. Such a design is already the subject of a patented design.

In this particular design, however, the conical surfaces H and K have a different center line than the engine axis, because they are conducted through an axial section which is not a precise circle but a convex polygon, shown by line 31 in FIGS. 21, 22 and 24 and by line 32 shown in FIGS. 22 and 24. FIGS. 23A, 24 and 25 show the same basic features as in FIGS. 22 and 23, but in a more simplified manner pointing out the basic idea. In this simplified arrangement the polygons 31 and 32 are shown in a typical callout and the polygons are straight lined in this arrangement instead of being convexly curved as shown in the more realistic FIG. 21.

The two oppositely inclined conical surfaces projected through the polygons 31 and 32 cause a smooth intersection between the points B and D in FIGS. 22 and 21 and in the schematic showings in FIGS. 24 and 25 there is no step on the surface as in the already mentioned known design.

The lines between points A and B and between points D and E in FIGS. 21 and 22 symbolize the transition zone between the polygon-like hub surface and precise conical surface with the engine axis as center line axially outside from points A and E.

FIGS. 18 and 19 show longitudinal sections through die (pressure) cast elements in one typical stage of the turbine. For ensuring precise radial clearance of the guide vanes against the running hub and the running vanes against the stator (casing) precisely machined cylindrical surfaces 29 in FIG. 19 and 30 in FIG. 18 are necessary together with a machined radial limitation of the vanes. These machined cylinders are cut out of the original conical surfaces of the casting. For the transition between machined cylinders 29 and 30 to the original conical casting surface, machined conical surfaces between points E and O in FIGS. 18 and 19 are made, which method is in the state of the art.

FIG. 19 shows also the radially inwardly directed flange 28 which replaces the two inward flanges of the design according to FIG. 1 in order to ease the application of die (pressure) casting with only two die parts moving in directions F for the ejection of the finished casting. This radial flange or disc 28 has multiple purposes: it ensures roundness of the runner with integral cast blades, stiffness and intercepts the radial centrifugal loads which might occur at high speeds in this particular type of turbine.

FIGS. 28 and 29 show how to use die (pressure) casting for the bearing support frame by means of subdivision into an external housing hull 23 and a hub portion with integrally cast support struts 23 A. This hub portion might be cast in the same method as described for the runners of the stages. The external housing hull can be cast in the same manner as the casing cylinder of FIG. 18, the latter with integrally cast guide vanes. The die will have four parts: two parts movable axially in directions F and at least two parts move radially to provide the external contour. Accordingly, all parts of the turbines shown in FIGS. 14 and 26 are suitable for die (pressure) casting which affords inexpensive mass production as is usual in the automotive industry. The meridianal surfaces and the blades might be covered by means of a plastic coat as protection against erosion, corrosion and cavitation.

The multi-stage axial flow turbine enables, together with the particular last anti-cavitation stage, a nearly complete deliberation from heavy and expensive concrete building requirements despite high running speeds, because the small suction head is only determined by the comparatively small total energy head of the last stage.

The high running speeds allow also the selection of a more light weight high speed generator.

Essential and important in all of these considerations is the inventive design of the multiple stages, that is, the possibility of simply combining a plurality of interchangeable stages for the formation of a water turbine. Such a water turbine construction makes it possible to provide even small power plants for remote areas at relatively low cost.

While specific embodiments of the invention have been shown and described in detail to illustrate the application of the inventive principles, it will be understood that the invention may be embodied otherwise without departing from such principles.

I claim:

1. An axial type water turbine comprising a pair of bearing support frames spaced apart along an axis of the water turbine with the bearing support frames extending around the axis, at least two interchangeable stages secured together in line in the direction of the turbine axis between said support frames, each of said at least two interchangeable stages comprises two prefabricated structural parts including an external axially extending tubular stator housing and an axially extending tubular runner hub located within and spaced radially inwardly from said stator housing, each said stator housing having a flange formed monolithically with said housing at each of the opposite ends thereof spaced apart in the axial direction and guide vanes formed monolithically thereon and extending radially inwardly therefrom, each said runner hub being coaxial with the axis of the water turbine, means for transmitting torque through each of said runner hubs, and runner vanes formed monolithically with extending radially outwardly from said runner hub, a central tie rod extending coaxially with the turbine axis through said at least two stages and said tie rod is threaded at each of its ends with the length thereof corresponding to the number of stages in the turbine and said tie rod does not center the running parts of the stages and is separate from said means for transmitting torque.

2. An axial type water turbine, as set forth in claim 1, wherein said means for transmitting torque comprises splines at each of the opposite ends of said runner hub.

3. An axial type water turbine, as set forth in claim 1, wherein said guide vanes and said runner means are cast members.

4. An axial type water turbine, as set forth in claim 1, wherein said stator housings of said at least two stages comprise guide vane cascades and said runner hubs of said at least two stages comprise runner vane cascades, each of said stator housings and each of said runner hubs having a surface facing the other and forming the surface contacted by the flow of water through the turbine, each said surface having a particular geometry comprising a pair of convex polygons located at each axial end of the runner vane cascades and the guide vane cascades, said polygons are arranged offset in the circumferential direction to one another and the offset dimension and the number of sides of the polygon depending on the number of said vane blades and on the pitch angle of the cascade, whereby the particular geometry of said facing surfaces permits the use of a reusable die for forming said tubular housings and said runner hubs with friction-free ejection of the member formed in the die with the die split into two parts.

5. An axial type water turbine, as set forth in claim 4, wherein conical surfaces are formed through the polygons with the conical axis thereof approximately parallel to the turbine axis and inclined from the axial ends of the runner vane cascade and the guide vane cascade axially inwardly to the cascades so that the annular flow cross section narrows from the outside and the inside and forms an intersection of two oppositely inclined conical surfaces for two oppositely located polygon sides so that the intersection is not stepped and has a slight surface tilt running along the line from the leading edge of one profile to the trailing edge of the adjacent profile within a cascade on the runner hub surface or on the stator housing surface.

6. An axial type water turbine, as set forth in claim 1, wherein the turbine having a flow exit end, a suction pipe located at the flow exit end of the turbine and having an exit end, a flow throttle member located at the exit end of said suction pipe.

7. An axial type water turbine, as set forth in claim 6, including a tubular cone diffuser at the exit end of said suction pipe, said flow throttle member comprising an axially movable cone at the end of said tubular cone diffuser having a common axis with said cone diffuser and a considerably larger cone angle relative to the axis of the water turbine.

8. An axial type water turbine, as set forth in claim 7, including the tubular cone diffuser in said suction pipe, a cylindrical slider axially movable on a common center line with said tubular cone diffuser and having a rigidly attached deflector cone of a considerably larger cone angle than the cone angle of said cone diffuser, and adjusting the axial width of the annular cylindrical exit area formed by said tubular cone diffuser and said deflector cone.

9. An axial type water turbine comprising a pair of bearing support frames spaced apart along an axis of the water turbine with the bearing support frames extending around the axis, at least two interchangeable stages secured together in line in the direction of the turbine axis between said support frames, each of said at least two interchangeable stages comprises two prefabricated structural parts including an external axially extending tubular stator housing and an axially extending tubular runner hub located within and spaced radially inwardly from said stator housing, each said stator housing having a flange formed monolithically with said housing at each of the opposite ends thereof spaced apart in the axial direction and guide vanes formed monolithically thereon and extending radially inwardly therefrom, each said runner hub being coaxial with the axis of the water turbine, means for transmitting torque through each of said runner hubs, and runner vanes formed monolithically with and extending radially outwardly from said runner hub, the turbine having a flow exit end, at least one stage located at the flow exit end of the interchangeable stages and having guide vanes and runner vanes, said at least one flow exit end stage having an increased annular flow area compared with the interchangeable stages upstream thereof and said at least one flow exit end stage having less curved profiles of said guide vanes and runner vanes thereof than the profiles of said guide vanes and runner vanes of said upstream interchangeable stages.

10. An axial type water turbine comprising a pair of bearing support frames spaced apart along an axis of the water turbine with the bearing support frames extending around the axis, at least two interchangeable stages secured together in line in the direction of the turbine axis between said support frames, each of said at least two interchangeable stages comprises two prefabricated structural parts including an external axially extending tubular stator housing and an axially extending tubular runner hub located within and spaced radially inwardly from said stator housing, each said stator housing having a flange formed monolithically with said housing at each of the opposite ends thereof spaced apart in the axial direction and guide vanes formed monolithically thereon and extending radially inwardly therefrom, each said runner hub being coaxial with the axis of the water turbine, means for transmitting torque through each of said runner hubs, and runner vanes formed monolithically with and extending radially outwardly from said runner hub, said runner hub having a hollow interior part comprising two coaxial cones whose diameters decrease toward a plane located in the region where the centers of gravity of said runner vane blade route profiles are located, and an annular disc located in the plane, so that a die with two axially moving parts are necessary for generating the external shape of said runner hub with integrally formed vanes.

* * * * *